April 16, 1940.  S. M. DAVIS  2,197,031
CHILD'S MEASURING RECORD
Filed Nov. 21, 1939
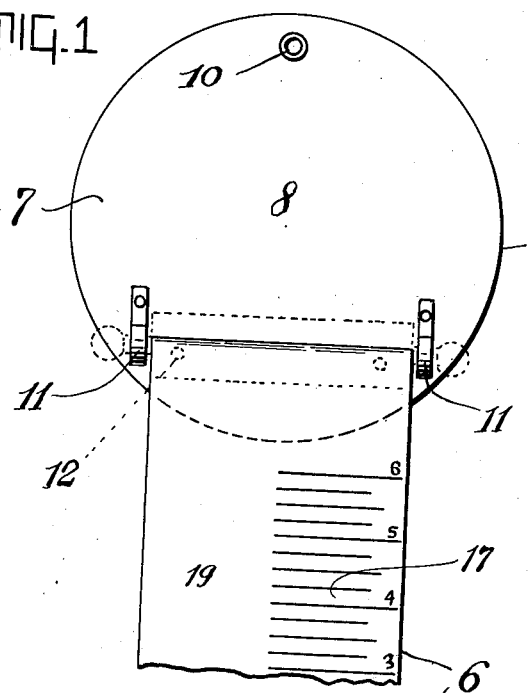
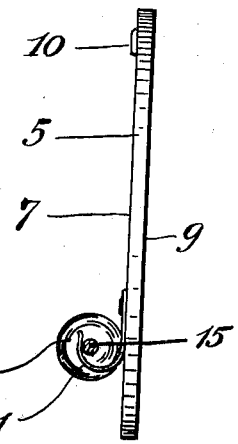
Stewart M. Davis
INVENTOR
BY Ivan E. C. Konigsberg
ATTORNEY Patented Apr. 16, 1940

2,197,031

UNITED STATES PATENT OFFICE 2,197,031

CHILD'S MEASURING RECORD

Stewart M. Davis, New York, N. Y.

Application November 21, 1939, Serial No. 305,483

2 Claims. (Cl. 33—137)

The object of this invention is to provide a child's measuring record whereby a record may be made and kept of the height and weight of a child progressively through the years of growth from the date of birth. The record may be started at any time and kept for as long as interest in such matters remain.

Another object is to provide such a record in the form of a recording chart which may be hung upon the wall of the nursery or bathroom as a constant reminder and object of interest and amusement.

The invention is embodied in the form of a wall plaque to which a record chart or scale record is secured. The chart is adapted to be unrolled for the purpose of entering a record and may be rolled up and placed in hooks attached to the plaque so that it may be kept clean. The fact that the record may be unrolled for inspection on entry of record adds a point of interest and amusement. The accompanying drawing illustrates the invention.

Fig. 1 is a face view of the device showing the record chart unrolled with parts broken away and also shows in dotted lines the record rolled up and resting in the hooks on the plaque.

Fig. 2 is a side view of the device looking from the right in Fig. 1 with a part in section.

The device consists of two main parts namely a wall plaque 5 and a flexible record 6. The plaque may be made of cardboard or any other suitable material and it may be circular as shown or have any other decorative or attractive form. Preferably the plaque has a surface 7 adapted to receive a picture or ornamental sketch which may be printed, painted or otherwise placed upon the plaque. The latter is purposely made large enough so as to be of suitable proportions and whereby a relatively large space 8 is provided to be decorated or which may receive a photograph of the child. The plaque is designed to be hung on a wall so the rear surface 9 is preferably without any projections. An eyelet 10 is provided so the plaque may be hung upon a nail.

Two record receiving hooks 11 are secured to the plaque and the flexible record 6 is secured to the plaque between these hooks by staples or rivets as at 12.

The record 6 is preferably made of linen or other washable material adapted to receive printing and to be rolled and unrolled many times without cracking. The free end 14 of the record is suitably secured to a roller 15 having knobs 16 for convenient handling.

The record is printed with a quarter inch scale 17 marked in inches in a conventional manner. The scale may indicate as high as 5½ feet. At the bottom there is printed an arrow 18 with directions for positioning the device at the correct height for measuring. The scale is marked with date and weight at the bottom and there are lines for writing the birthday and name of the child. The scale occupies only one half of the record and the date and also weight, if de- purposely left blank so that pictures corresponding to the different ages of the child may be printed thereon for amusement. The space 19 may also be used to receive photographs of the advancing ages of the child.

In use the arrow 18 is set at the height indicated. The scale is unrolled and stretched against the wall and then a nail put through the eyelets 10 and hammered into the wall. The scale marks will then be the correct height above the floor. The scale may be rolled up and placed in the hooks 11 as shown in dotted lines in Fig. 1 and also in Fig. 2. When a record is to be made the scale is unrolled, the child placed against he record and the date and also weight, if desired, is written on the line of measure. Thus as indicated in the drawing on May 21, 1939, the child weighed 42 pounds and was 3 feet high.

The device is inexpensive to manufacture as an article of commerce. It provides a permanent record of the entries and is an object of amusement and interest.

I claim:

1. As a new article of manufacture a measuring device comprising a plaque, a flexible rollable extensible scale member having its one end secured to said plaque, a roller secured to the other end of said flexible member for rolling up the same, hooks on said plaque for receiving and supporting said rolled up flexible member, a height measuring scale imprinted on said flexible member, the latter having spaces for entering records, an eyelet on said plaque for positioning said plaque upon a support for height measuring purposes according to said scale and a mark on said flexible member for determining the position of said plaque on a support.

2. As a new article of manufacture a measuring device comprising a supporting member and a flexible scale member secured to said supporting member and adapted to be unrolled therefrom and rolled up again to be supported thereon in rolled up condition, means for securing one end of said flexible member to said supporting member, a roller secured to the free end of said flexible member whereby to roll up the same, hooks on said supporting member for receiving and supporting said roller with the rolled up flexible member, a height measuring scale on the latter having spaces for entering records corresponding to the marks of said scale, a printed mark on said flexible member near the free end thereof for positioning said scale member and supporting member for height measuring purposes according to said scale and means for securing said supporting member to a support.

STEWART M. DAVIS.